(12) United States Patent
Yang et al.

(10) Patent No.: US 10,938,028 B2
(45) Date of Patent: Mar. 2, 2021

(54) NEGATIVE ELECTRODE FOR LITHIUM SECONDARY BATTERY AND METHOD OF MANUFACTURING

(71) Applicant: GM GLOBAL TECHNOLOGY OPERATIONS LLC, Detroit, MI (US)

(72) Inventors: Li Yang, Troy, MI (US); Mei Cai, Bloomfield Hills, MI (US); Fan Xu, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 27 days.

(21) Appl. No.: 16/165,292

(22) Filed: Oct. 19, 2018

(65) Prior Publication Data

US 2020/0127285 A1 Apr. 23, 2020

(51) Int. Cl.
*H01M 10/0569* (2010.01)
*H01M 10/0568* (2010.01)
(Continued)

(52) U.S. Cl.
CPC ......... *H01M 4/382* (2013.01); *H01M 4/0452* (2013.01); *H01M 4/134* (2013.01); *H01M 4/1395* (2013.01); *H01M 10/052* (2013.01); *H01M 10/0568* (2013.01); *H01M 10/0569* (2013.01); *H01M 2004/021* (2013.01); *H01M 2004/025* (2013.01); *H01M 2004/027* (2013.01)

(58) Field of Classification Search
None
See application file for complete search history.

(56) References Cited

U.S. PATENT DOCUMENTS 9,761,861 B1 * 9/2017 Holme ................... H01M 4/045
2014/0138591 A1 * 5/2014 Yoon ..................... H01M 4/5825
252/519.14
(Continued)

OTHER PUBLICATIONS

Lin et al., "Three-dimensional stable lithium metal anode with nanoscale lithium islands embedded in ionically conductive solid matrix," www.pnas.org, May 2, 2017, vol. 114 No. 18, pp. 4613-4618, published online.

(Continued)

*Primary Examiner* — Scott J Chmielecki
(74) *Attorney, Agent, or Firm* — Quinn IP Law

(57) ABSTRACT

A negative electrode for an electrochemical cell of a secondary lithium metal battery may comprise a negative electrode current collector and a three-dimensional columnar lithium metal layer formed on a surface of the current collector. The columnar lithium metal layer may comprise a plurality of lithium metal columns and may be formed on the current collector using an electrochemical deposition process. In such process, the current collector and a counter electrode may be at least partially submerged in a nonaqueous liquid electrolyte solution and an electrical potential may be established between the metal substrate and the counter electrode such that lithium ions in the electrolyte solution are reduced to metallic lithium and deposited on the surface of the current collector in the form of a three-dimensional columnar lithium metal layer. The electrolyte solution may comprise lithium bis(fluorosulfonyl)imide (LiFSI) in a solution of fluoroethylene carbonate (FEC) and dimethyldicarbonate (DMDC).

14 Claims, 3 Drawing Sheets

(51) Int. Cl.
*H01M 4/134* (2010.01)
*H01M 4/38* (2006.01)
*H01M 10/052* (2010.01)
*H01M 4/1395* (2010.01)
*H01M 4/04* (2006.01)
*H01M 4/02* (2006.01)

(56) References Cited

U.S. PATENT DOCUMENTS

| | | | |
|---|---|---|---|
| 2015/0333373 A1* | 11/2015 | Ho | H01M 10/0567 |
| | | | 429/326 |
| 2017/0187030 A1* | 6/2017 | Grant | H01M 4/0452 |
| 2017/0331092 A1* | 11/2017 | Chen | H01M 2/1653 |
| 2018/0254524 A1* | 9/2018 | Zhang | H01M 12/08 |
| 2019/0058219 A1* | 2/2019 | Yang | H01M 10/0569 |
| 2019/0123390 A1* | 4/2019 | Xu | H01M 10/4235 |
| 2019/0207261 A1* | 7/2019 | Yang | H01M 4/5815 |
| 2019/0348668 A1* | 11/2019 | Kim | H01M 4/66 |

OTHER PUBLICATIONS

Lin et al., "Layered reduced graphene oxide with nanoscale interlayer gaps as a stable host for lithium metal anodes," www.nature.com/naturenanotechnology, Mar. 21, 2016, pp. 1-8, Macmillian Publishers Limited, published online.

* cited by examiner

NEGATIVE ELECTRODE FOR LITHIUM SECONDARY BATTERY AND METHOD OF MANUFACTURING

INTRODUCTION

A battery is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

Secondary lithium batteries generally comprise one or more electrochemical cells that include a negative electrode, a positive electrode, a porous separator, an electrolyte, a negative current collector, and a positive current collector. Such batteries are powered by the cooperative movement of lithium ions and electrons between the negative and positive electrodes of each electrochemical cell. The electrolyte is ionically conductive and provides a medium for the conduction of the lithium ions through the electrochemical cell between the negative and positive electrodes. The current collectors are electrically conductive and allow the electrons to simultaneously travel from one electrode to another via an external circuit. The porous separator physically separates and electrically insulates the electrodes from each other while permitting free ion flow therebetween.

Lithium metal is a desirable negative electrode material for secondary lithium metal batteries due to its high specific capacity (3,860 mAh/g) and its relatively low reduction potential (−3.04 V versus standard hydrogen electrode). When lithium metal is used as the negative electrode material in a battery, the lithium metal in the negative electrode is oxidized to lithium ions ($Li^+$) during discharge of the battery and the lithium ions travel from the negative electrode, through the electrolyte, to the positive electrode, where the lithium ions are stored. When the battery is recharged, the lithium ions are released from the positive electrode and travel from the positive electrode, through the electrolyte, and back to the negative electrode, where the lithium ions are reduced to lithium metal and re-deposited.

The rate at which a lithium metal battery can be discharged and re-charged (or cycled) is dependent upon the rate at which lithium metal is oxidized to lithium ions at the negative electrode and the rate at which lithium ions are reduced to lithium metal and re-deposited at the negative electrode. In addition, the amount of lithium metal available to participate in the oxidation and reduction reactions during discharge and recharge of the battery is dependent upon the efficiency at which the lithium ions are stripped from and redeposited at the negative electrode without undergoing irreversible side reactions. Therefore, there is a need in the art for a method of improving the efficiency and rate at which lithium ions are repeatedly stripped from and redeposited at the negative electrode in order to improve the charging rate and coulombic efficiency of secondary lithium metal batteries.

SUMMARY

A negative electrode for an electrochemical cell of a lithium metal battery may comprise a metal negative electrode current collector and a three-dimensional columnar lithium metal layer formed on a surface of the current collector. The columnar lithium metal layer may comprise a plurality of polycrystalline or amorphous columns of lithium metal having proximal ends adjacent the surface of the current collector and distal ends extending away from the current collector.

The columns of lithium metal may be physically bonded to the surface of the current collector.

The columnar lithium metal layer may have a thickness in the range of 10 micrometers to 100 micrometers.

Each of the columns of lithium metal may have a width in the range of 0.5 micrometers to 1.5 micrometers.

The columnar lithium metal layer may have a porosity in the range of 3% to 4%.

The surface of the current collector may be planar, and a surface of the columnar lithium metal layer may be nonplanar.

An electrochemical cell of a secondary lithium metal battery may comprise a positive electrode, the negative electrode, and an electrolyte in ionic contact with the positive and negative electrodes. The positive electrode may include a positive electrode active material layer electrically coupled to a metal positive electrode current collector. The electrolyte may comprise a nonaqueous liquid electrolyte solution including a lithium salt dissolved in a polar aprotic organic solvent. The lithium salt may comprise lithium bis(fluorosulfonyl)imide (LiFSI) and the polar aprotic organic solvent may comprise fluoroethylene carbonate (FEC) and dimethyldicarbonate (DMDC).

A secondary lithium metal battery may include a plurality of the electrochemical cells. The electrochemical cells may be connected in a series or parallel arrangement.

In a method of manufacturing a negative electrode for an electrochemical cell of a lithium metal battery, an electrically conductive metal substrate and a nonaqueous liquid electrolyte solution may be provided. The electrolyte solution may include a lithium salt dissolved in a polar aprotic organic solvent. The lithium salt may comprise lithium bis(fluorosulfonyl)imide (LiFSI) and the polar aprotic organic solvent may comprise fluoroethylene carbonate (FEC) and dimethyldicarbonate (DMDC). A surface of the metal substrate may be at least partially submerged in the electrolyte solution. An electrical potential may be established between the metal substrate and a counter electrode at least partially submerged in the electrolyte solution. Lithium ions in the electrolyte solution may be reduced to metallic lithium and deposited on the surface of the metal substrate in the form of a three-dimensional columnar lithium metal layer. The columnar lithium metal layer may comprise a plurality of polycrystalline or amorphous columns of lithium metal having proximal ends adjacent the surface of the current collector and distal ends extending away from the current collector.

The columnar lithium metal layer may comprise, by weight, greater than 97% lithium and may be directly bonded to the surface of the current collector.

The nonaqueous liquid electrolyte solution may have a lithium salt concentration in the range of 2 M to 6 M.

Lithium bis(fluorosulfonyl)imide may constitute, by weight, greater than 70% of the lithium salt in the nonaqueous liquid electrolyte solution. A mixture of fluoroethylene carbonate and dimethyldicarbonate may constitute, by volume, greater than 70% of the organic solvent in the nonaqueous liquid electrolyte solution.

The columnar lithium metal layer may have a thickness in the range of 10 micrometers to 100 micrometers.

Each of the columns of lithium metal may have a width in the range of 0.5 micrometers to 1.5 micrometers.

The columnar lithium metal layer may have a porosity in the range of 3% to 4%.

The surface of the current collector may be planar, and a surface of the columnar lithium metal layer may be nonplanar.

The electrical potential between the metal substrate and the counter electrode may be established by applying an electric charge to the counter electrode at an electric charge current density in the range of 0.5 mA/cm$^2$ to 5 mA/cm$^2$.

In one form, the electrical potential between the metal substrate and the counter electrode may be established by applying a pulsed electric charge to the counter electrode.

The metal substrate may be non-porous and may include a first major surface and an opposite second major surface. In such case, the columnar lithium metal layer may be formed on at least one of the first or second major surfaces of the metal substrate.

After the lithium metal layer is formed on the surface of the metal substrate, the metal substrate and the lithium metal layer may be formed into a negative electrode exhibiting a desired size and shape. The negative electrode may be incorporated into an electrochemical cell of a secondary lithium metal battery.

DETAILED DESCRIPTION

The negative electrode described herein uses lithium metal as a negative electrode active material, instead of a lithium intercalation material, and thus can be used to manufacture electrochemical cells with relatively high energy density, as compared to electrochemical cells that include other elements or compounds as the negative electrode active material. During manufacture of the negative electrode, metallic lithium is deposited on a surface of a metal substrate in the form of a porous three-dimensional columnar lithium metal layer made up of a plurality of columns of lithium metal. The porous, three-dimensional columnar structure of the lithium metal layer increases the active surface area of the layer without sacrificing capacity, which can help increase the charging rate and cycle life of the electrochemical cell, as compared to electrochemical cells that are manufactured with substantially planar, non-porous layers of lithium metal as the negative electrode active material.

Figure 1:
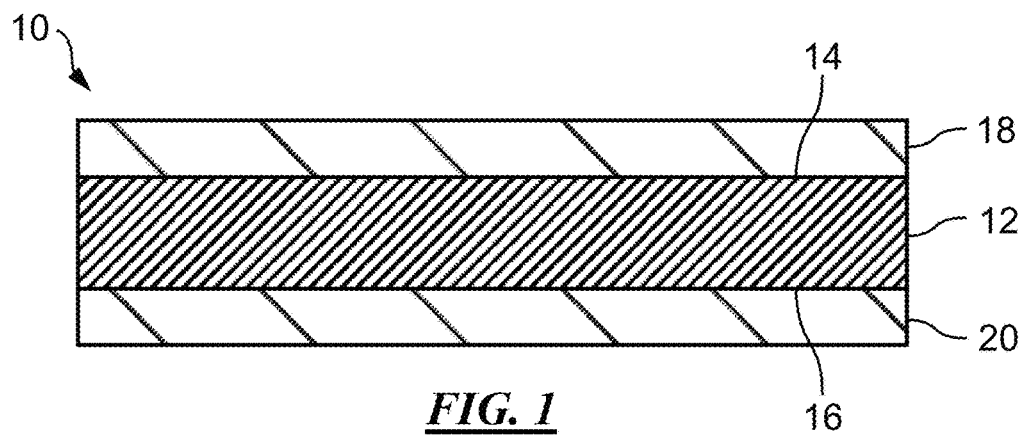
FIG. 1 is a side cross-sectional view of a negative electrode, including a negative electrode current collector having a first lithium metal layer formed on a first major surface thereof and a second lithium metal layer formed on a second major surface thereof.

FIG. 1 illustrates in idealized fashion a side cross-sectional view of a negative electrode 10 for an electrochemical cell (not shown) of a secondary lithium metal battery (not shown). The negative electrode 10 includes a negative electrode current collector 12 having a first major surface 14 and an opposite second major surface 16. A first lithium metal layer 18 is formed directly on the first major surface 14 of the current collector 12, and a second lithium metal layer 20 is formed directly on the second major surface 16 of the current collector 12.

In assembly, the negative electrode 10 may be electrically coupled to a positive electrode (not shown) which may include a metal positive electrode current collector coated on one of both sides with a positive electrode active material layer. A porous separator layer (not shown) may be sandwiched between one of the first or second lithium metal layers 18, 20 of the negative electrode current collector 12 and an opposing positive electrode active material layer of the positive electrode current collector so that lithium ions can flow through the separator layer between the opposing lithium metal layer and the positive electrode active material layer while electrons simultaneously travel between the lithium metal layer and the positive electrode active material layer (and between the negative electrode current collector and the positive electrode current collector) via an external circuit.

The negative electrode current collector 12 may comprise any material that is capable of collecting and reversibly passing free electrons to and from the lithium metal layers 18, 20. For example, the negative electrode current collector 12 may comprise an electrically conductive metal or metal alloy, e.g., a transition metal or alloy thereof. In some specific examples, the negative electrode current collector 12 may comprise copper (Cu), nickel (Ni), an iron (Fe) alloy (e.g., stainless steel), or titanium (Ti). Other electrically conductive metals may of course be used, if desired.

The negative electrode current collector 12 may be in the form of a thin and flexible porous or non-porous electrically conductive metal substrate. For example, the negative electrode current collector 12 may be in the form of a thin and flexible non-porous metal foil, a porous metal mesh, a perforated metal sheet, or a porous open cell metal foam. The specific configuration of the negative electrode current collector 12 may depend upon the intended application of use. The negative electrode current collector 12 may have a thickness in the range of 8 micrometers to 150 micrometers. For example, in embodiments where the negative electrode current collector 12 is in the form of a non-porous metal foil, a porous metal mesh, or a perforated metal sheet, the current collector 12 may have thicknesses in the range of 8 micrometers to 20 micrometers. As another example, in embodiments where the negative electrode current collector 12 is in the form of porous open-cell metal foams, the current collector 12 may have thicknesses in the range of 50 micrometers to 150 micrometers.

In FIG. 1, the first and second major surfaces 14, 16 of the current collector 12 are depicted as being substantially flat or planar, which may be the case in embodiments where the current collector 12 comprises a metal foil or a perforated metal sheet. However, in other embodiments, for example, where the current collector 12 comprises a metal mesh or an open-cell metal foam, the surfaces 14, 16 of the current collector 12 may be contoured and the lithium metal layers 18, 20 may substantially conform to the contours thereof.

Figure 2:
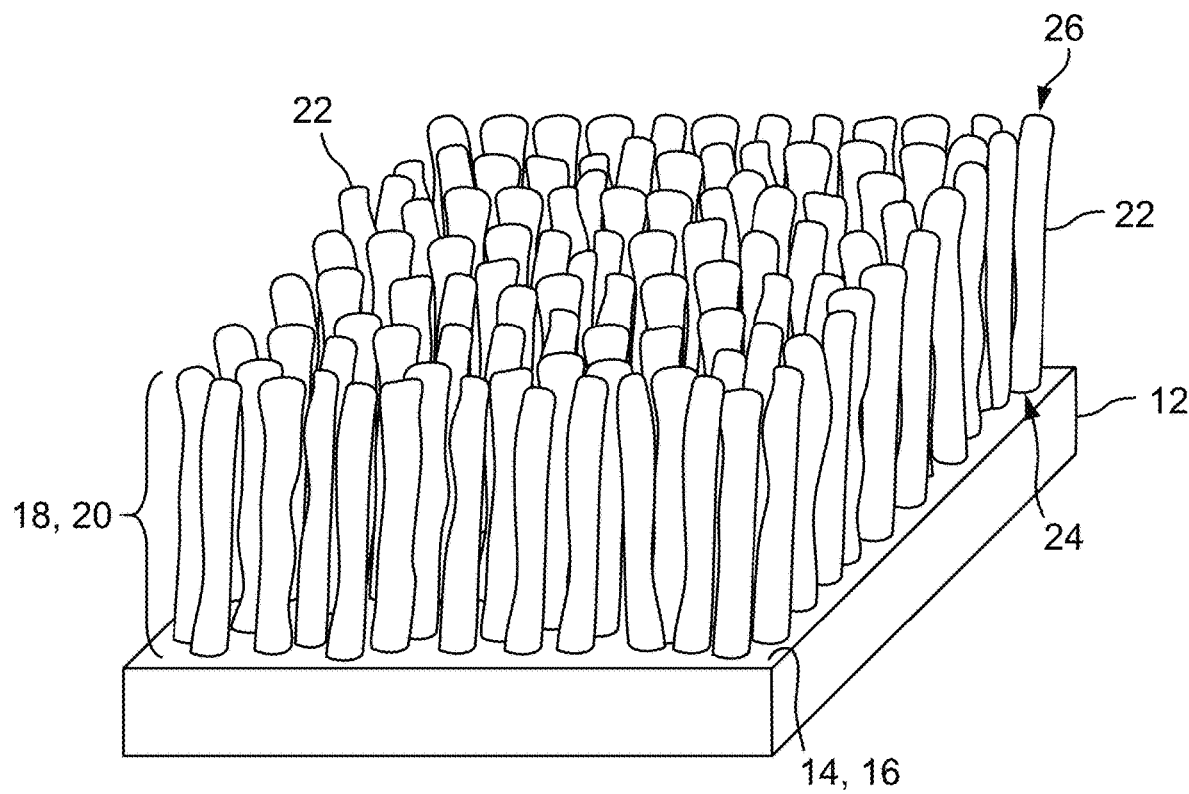
FIG. 2 is an enlarged perspective view of a portion of the negative electrode of FIG. 1 illustrating the three-dimensional columnar structure of one of the lithium metal layers.

Referring now to FIG. 2, the first and second lithium metal layers 18, 20 are respectively physically bonded to the first and second major surfaces 14, 16 of the current collector 12. The first and second lithium metal layers 18, 20 may be directly bonded to the first and second major surfaces 14, 16 of the current collector 12, meaning that no intermediate material layers are formed on the first and second major surfaces 14, 16 of the current collector 12 prior to formation of the first and second lithium metal layers 18, 20. The first and second lithium metal layers 18, 20 exhibit a three-dimensional columnar structure, with each of the layers 18, 20 comprising a plurality of polycrystalline or amorphous lithium metal pillars or columns 22. Each of the columns 22 has a proximal end 24 adjacent the first or second major surface 14, 16 of the current collector 12 and a distal end 26 extending away from the current collector 12. The columns 22 effectively increase the surface area of the layers 18, 20 and thereby increase the rate at which lithium ions may be plated on and stripped from the surfaces 14, 16 of the current collector, as compared to current collectors that are plated with solid, planar layers of lithium metal. For example, the columns 22 may provide the layers 18, 20 with porosity in the range of 3% to 4%.

The columns 22 may be stochastically arranged on the first and second major surfaces 14, 16 of the current collector 12. In FIG. 2, the columns 22 are depicted as being spaced-apart from one another on the surface 14, 16 of the current collector 12. However, in other embodiments, the columns 22 may be packed relatively closely together and may abut one another as the columns 22 extend away from the current collector 12.

The columns 22 may have widths, measured parallel to a plane defined by the first or second major surface 14, 16 of the current collector 12, in the range of 0.5 µm to 1.5 µm. The lithium metal columns 22 may have heights, measured perpendicular to the first or second major surface 14, 16 of the current collector 12, in the range of 10 micrometers to 100 micrometers, and the lithium metal layers 18, 20 may have thicknesses in the range of 10 micrometers to 100 micrometers. As such, the capacity loading of each of the lithium metal layers 18, 20 on the current collector 12 may be in the range of 2 mAh/cm$^2$ to 20 mAh/cm$^2$.

The lithium metal columns 22 may consist essentially of lithium (Li) metal. For example, the lithium metal columns 22 may comprise, by weight, greater than 97% lithium or, more preferably, greater than 99% lithium.

The lithium metal layers 18, 20 preferably do not comprise any other elements or compounds that undergo a reversible redox reaction with lithium during operation of the electrochemical cell. For example, the lithium metal layers 18, 20 preferably do not comprise an intercalation host material that is formulated to undergo the reversible insertion or intercalation of lithium ions or an alloying material that can electrochemically alloy and form compound phases with lithium. In addition, the lithium metal layers 18, 20 preferably do not comprise a conversion material or an alloy material that can electrochemically alloy and form compound phases with lithium. Some examples of materials that are preferably excluded from the lithium metal layers 18, 20 of the present disclosure include carbon-based materials (e.g., graphite, activated carbon, carbon black, and graphene), silicon and silicon-based materials, tin oxide, aluminum, indium, zinc, cadmium, lead, germanium, tin, antimony, titanium oxide, lithium titanium oxide, lithium titanate, lithium oxide, metal oxides (e.g., iron oxide, cobalt oxide, manganese oxide, copper oxide, nickel oxide, chromium oxide, ruthenium oxide, and/or molybedenum oxide), metal phosphides, metal sulfides, and metal nitrides (e.g., phosphides, sulfides, and/or nitrides or iron, manganese, nickel, copper, and/or cobalt). In addition, the lithium metal layers 18, 20 preferably do not comprise a polymeric binder. Some examples of polymeric binders that are preferably excluded from the lithium metal layers 18, 20 of the present disclosure include polyvinylidene fluoride (PVdF), ethylene propylene diene monomer (EPDM) rubber, styrene butadiene rubber (SBR), carboxymethyl cellulose (CMC), and polyacrylic acid.

Figure 3:
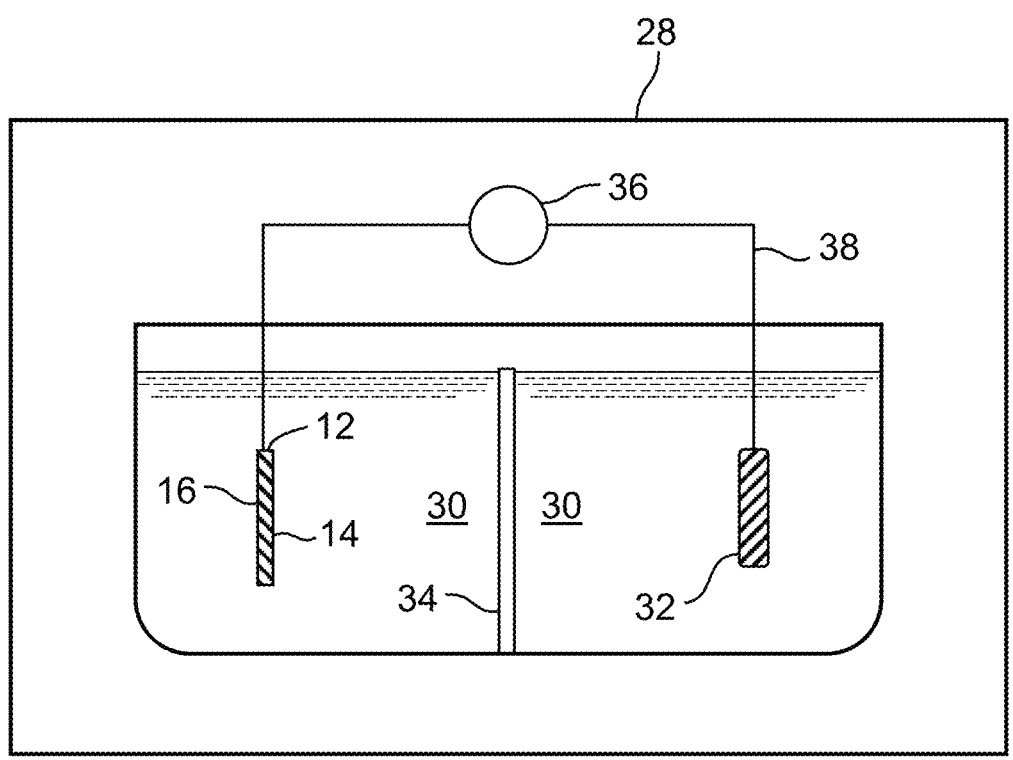
FIG. 3 is a cross-sectional view of an embodiment of an apparatus for forming a three-dimensional columnar lithium metal layer on a surface of an electrically conductive metal substrate via an electrochemical deposition process.

Referring now to FIG. 3, the first and second lithium metal layers 18, 20 may be respectively formed on the first and second major surfaces 14, 16 of the current collector 12 using an electrochemical deposition process (also referred to as electroplating). In such case, the current collector 12 may be placed in an enclosed chamber 28 and at least partially submerged in a nonaqueous liquid electrolyte solution 30 along with a counter electrode 32. In some embodiments, the current collector 12 and the counter electrode 32 may be physically separated from each other in the electrolyte solution 30 by a porous separator 34.

The nonaqueous liquid electrolyte solution 30 is ionically conductive and comprises a lithium salt dissolved in a polar aprotic organic solvent. The nonaqueous liquid electrolyte solution 30 may have a lithium salt concentration in the range of 2 M to 6 M or, more specifically, in the range of 3 M to 5 M. In one specific example, the nonaqueous liquid electrolyte solution 30 may have a lithium salt concentration of about 4 M.

The electrolyte solution 30 is formulated so that, during the electrochemical deposition process, metallic lithium is deposited on the current collector 12 in the form of a plurality of columns 22, as shown in FIG. 2, instead of being deposited in the form of a uniform planar layer. As such, lithium bis(fluorosulfonyl)imide, LiFSI, is preferably the predominant lithium salt in the electrolyte solution 30, meaning that LiFSI represents the largest volume fraction and/or the largest mass fraction of all lithium salts in the electrolyte solution 30. For example, LiFSI may account for, by weight, greater than 50%, greater than 70%, or greater than 90% of all lithium salts in the electrolyte solution 30. In one form, the lithium salt in the electrolyte solution 30 may consist of lithium bis(fluorosulfonyl)imide. In addition, the predominant organic solvents in the electrolyte solution 30 are carbonate esters, meaning that one or more carbonate esters represent the largest volume fraction and/or the largest mass fraction of all organic solvents in the electrolyte solution 30. In one form, the predominant organic solvents in the electrolyte solution 30 comprise a mixture of a fluorinated cyclic carbonate (e.g., fluoroethylene carbonate, FEC) and a dialkyl carbonate (e.g., dimethyl dicarbonate, DMDC), meaning that a mixture of a fluorinated cyclic carbonate and a dialkyl carbonate represents the largest volume fraction and/or the largest mass fraction of all organic solvents in the electrolyte solution 30. For example, in one form, fluoroethylene carbonate and dimethyl dicarbonate may account for, by weight and/or volume, greater than 50%, greater than 70%, or greater than 90% of all organic solvents in the electrolyte solution 30. In one form, the organic solvent may consist of fluoroethylene carbonate and dimethyl dicarbonate (1:1 v/v). The electrolyte solution 30 is preferably formulated so that LiFSI is the predominant lithium salt in the electrolyte solution 30 and fluoroethylene carbonate and dimethyl dicarbonate are the predominant organic solvents in the electrolyte solution 30 because, without intending to be bound by theory, it is believed that such a formulation is necessary for the development of a three-dimensional columnar structure in the lithium metal layers 18 during the electrochemical deposition process.

In some embodiments, the electrolyte solution 30 may include one or more additional lithium salts (referred to herein as "co-salts") other than LiFSI. Some examples of co-salts that may be included in the electrolyte solution 30 in relatively small amounts include: $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiN(SO_2F)_2$, LiBOB, LiDFOB, $LiPF_6$, $LiNO_3$, $Li_2SO_4$, and/or LiCl. When present, the combined amount of the one or more co-salts included in the electrolyte solution 30 may comprise, by weight and/or volume, less than 20%, less than 10%, or less than 5% of the total amount of lithium salts present in the electrolyte solution 30.

In some embodiments, the electrolyte solution 30 may include one or more additional organic solvents (referred to herein as "co-solvents") other than fluoroethylene carbonate and dimethyl decarbonate. Some examples of co-solvents that may be included in the electrolyte solution 30 in relatively small amounts include: acyclic ethers (e.g., 1,2-dimethoxyethane (DME), 1,2-diethoxyethane, ethoxymethoxyethane, tetraethylene glycol dimethyl ether, and/or poly(ethylene glycol) dimethyl ether), cyclic ethers (i.e., tetrahydrofuran and/or 2-methyltetrahydrofuran), carboxylic acid esters (e.g., methyl formate, methyl acetate, and/or methyl propionate), and/or γ-lactones (e.g., γ-butyrolactone and/or γ-valerolactone). When present, the combined amount of the one or more co-solvents included in the electrolyte solution 30 may comprise, by weight and/or volume, less than 20%, less than 10%, or less than 5% of the total amount of organic solvents present in the electrolyte solution 30.

The counter electrode 32 may be sacrificial or permanent. In embodiments where the counter electrode 32 is sacrificial, the electrode 32 may comprise any lithium-containing material that can electrochemically release lithium ions when an electrical potential is established between the current collector 12 and the counter electrode 32. For example, in one form, the counter electrode 32 may consist essentially of lithium (Li) metal, e.g., the counter electrode 32 may comprise, by weight, greater than 97% lithium or, more preferably, greater than 99% lithium. In other embodiments, the counter electrode 32 may be a host material with intercalated lithium ions or a lithium alloy. Examples of host materials that can be intercalated or alloyed with lithium include: carbon-based materials (e.g., graphite, activated carbon, carbon black, and graphene), silicon, silicon-based alloys, tin oxide, aluminum, indium, zinc, germanium, silicon oxide, titanium oxide, lithium titanate, transition metal oxides represented by the formula $LiMeO_2$, $LiMePO_4$, and/or $LiMe_2O_4$, where Me is a transition metal, and combinations thereof. In embodiments where the counter electrode 32 is permanent, the electrode 32 may comprise an inert metal or an inert metal alloy.

The porous separator 34 may comprise any organic or inorganic material that can physically separate and electrically insulate the current collector 12 from the counter electrode 32 while permitting the free flow of lithium ions therebetween. For example, the separator 34 may comprise a non-woven material, e.g., a manufactured sheet, web, or matt of directionally or randomly oriented fibers. As another example, the separator 34 may comprise a microporous polymeric material, e.g., a microporous polyolefin-based membrane or film. The separator layer 16 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In one form, the separator 34 may comprise a laminate of one or more polymeric materials, such as a laminate of PE and PP. The separator 34 may have a thickness in the range of 10 μm to 30 μm.

The current collector 12 and the counter electrode 32 are electrically coupled to each other and to a power supply 36 via an external circuit 38. To begin the electrochemical deposition process, an electrical potential is established between the current collector 12 and the counter electrode 32, for example, by applying an electric current from the power supply 36 to the counter electrode 32 (electrons flow in the opposite direction to the current collector 12). Establishing an electrical potential between the current collector 12 and the counter electrode 32 initiates chemical oxidation and reduction reactions at the current collector 12 and the counter electrode 32. As a result, lithium metal ions dissolved in the electrolyte solution 30 are reduced at the interface between the electrolyte solution 30 and the current collector 12 such that metallic lithium is deposited onto the first and second major surfaces 14, 16 of the current collector 12. The electrolyte solution 30 is formulated so that, during the electrochemical deposition process, metallic lithium is deposited on the current collector 12 in the form of a plurality of columns 22, as shown in FIG. 2, instead of being deposited in the form of a uniform planar layer.

In embodiments where the counter electrode 32 comprises lithium, when an electrical potential is established between the current collector 12 and the counter electrode 32, lithium from the counter electrode 32 is oxidized and dissolves in the electrolyte solution 30. The rate at which lithium from the counter electrode 32 dissolves in the electrolyte solution 30 is equal to the rate at which metallic lithium is plated or deposited on the first and second major surfaces 14, 16 of the current collector 12. In embodiments where the counter electrode 32 comprises an inert metal or an inert metal alloy, lithium ions must be periodically replenished in the electrolyte solution 30 to ensure a sufficient supply of lithium is available for depositing on the current collector 12.

The amount of metallic lithium deposited on the surfaces 14, 16 of the current collector 12 and the resulting thickness of the lithium metal layers 18, 20 can be controlled by controlling the electric current applied to the counter electrode 32 during the electrochemical deposition process and the duration thereof. In some embodiments, a pulsed electric current may be applied to the counter electrode 32 during the electrochemical deposition process to allow the electrolyte solution 30 to reach an equilibrium state between current pulses.

The electric charge current density applied to the counter electrode 32 during the electrochemical deposition process may be in the range of one $\mu A/cm^2$ to one $A/cm^2$. For example, in one form, the electric charge current density applied to the counter electrode 32 during the electrochemical deposition process may be in the range of 0.5 $mA/cm^2$ to 5 $mA/cm^2$. The electrical potential established between the current collector 12 and the counter electrode 32 during the electrochemical deposition process may be in the range of greater than 0 V to 1.0 V and may depend upon the composition of the current collector 12, the counter electrode 32, and the electrolyte solution 30. The duration of the deposition process may depend upon the desired thickness of the lithium metal layers 18, 20 and the electric charge current density applied to the counter electrode 32 during the electrochemical deposition process. In one form, the electric current charge density applied to the counter electrode 32 during the electrochemical deposition process may be in the range of 0.5 mA/cm$^2$ to 1 mA/cm$^2$ and the deposition process may be performed for a duration in the range of 4 hours to 8 hours to form lithium metal layers 18, 20 having thicknesses of about 20 μm.

In some embodiments, the electrochemical deposition process described above may be used to deposit one or more three-dimensional columnar lithium metal layers onto one or more major surfaces of an electrically conductive metal substrate (not shown). Thereafter, the metal substrate including the columnar lithium metal layer(s) may be formed into a negative electrode exhibiting a desired size and shape. Thereafter, the as-formed negative electrode may be incorporated into an electrochemical cell of a secondary lithium metal battery. In such case, the three-dimensional columnar lithium metal layer(s) deposited onto the major surface(s) of the metal substrate may comprise the negative electrode active material of the electrochemical cell.

EXAMPLES

Negative electrode samples were prepared in a laboratory environment by depositing layers of lithium metal onto copper substrates using an electrochemical deposition process. The morphology and porosity of the resulting lithium metal layers were analyzed using cryo focused ion beam-scanning electron microscopy (cryo FIB-SEM). Thereafter, each of the as-prepared lithium metal negative electrode samples was combined with a positive electrode and a porous separator to form a full electrochemical cell. The cycling performance of the as-prepared electrochemical cells was evaluated at different charging rates.

Example 1

Figure 4:
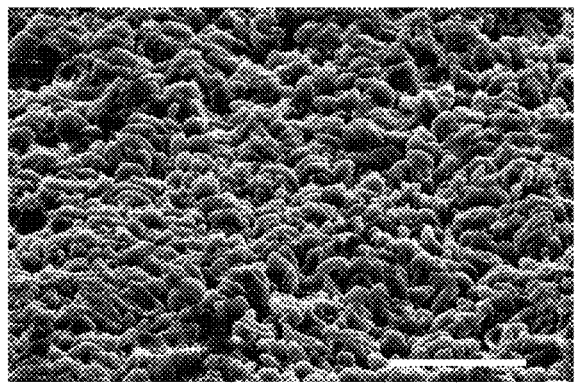
FIG. 4 is a scanning electron microscope (SEM) image of a top surface of a three-dimensional columnar lithium metal layer formed on a copper substrate using an electrochemical deposition process.
Figure 5:
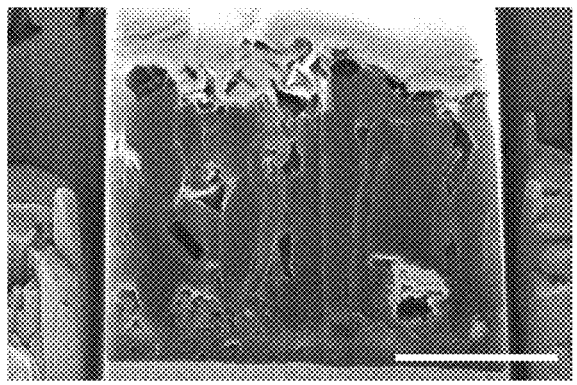
FIG. 5 is an SEM image of a cross-section of the three-dimensional columnar lithium metal layer of FIG. 4.

A negative electrode including a three-dimensional columnar lithium metal layer as described above (columnar Li-negative electrode) was prepared by submerging a copper substrate (10 μm thickness) and a sacrificial lithium metal counter electrode (~500 μm thickness) in a nonaqueous liquid electrolyte solution. The copper substrate and the counter electrode were isolated from each other in the electrolyte solution by a polypropylene and polyethylene multilayer porous separator having a thickness of 25 μm. The electrolyte solution included 4M lithium bis(fluorosulfonyl)imide (LiFSI) dissolved in a mixture of fluoroethylene carbonate (FEC) and dimethyl decarbonate (DMDC) (1:1 v/v) (the LiFSI-FEC:DMDC electrolyte solution). An electric charge of 0.5 mA/cm$^2$ was applied to the counter electrode for a duration of about 8 hours to deposit a columnar lithium metal layer having a thickness of 20 μm and a porosity of 3.3% on the copper substrate. The morphology of the resulting columnar lithium metal layer is shown in FIGS. 4 and 5. The scale bar in FIG. 4 is 10 μm. The scale bar in FIG. 5 is 4 μm.

The cycling performance of the columnar Li-negative electrodes was evaluating by using the as-prepared columnar Li-negative electrodes to construct full lithium battery cells. Each cell was assembled in an Ar-filled glovebox and included a positive electrode and a porous separator positioned between the columnar Li-negative electrode and the positive electrode. The positive electrode included a layer of lithium nickel manganese cobalt oxide (NMC) having a thickness of 80 μm coated on an aluminum foil (16 μm thickness). The porous separator was a multilayer polypropylene and polyethylene separator having a thickness of 25 μm. Each full cell was filled with the LiFSI-FEC:DMDC electrolyte solution. The capacity of each full cell was 5 mAh.

The cycling performance of the full cells including the columnar Li-negative electrodes was evaluated by discharging and recharging the cells at different charge rates: C/10 (0.5 mA/cm$^2$) and C/5 (1 mA/cm$^2$) within a voltage window of 3.0 V to 4.3 V. The cycle life of each of the cells was met when the maximum charge capacity of the cell was reduced to 85% of its initial capacity (i.e., when the maximum charge capacity of each cell fell below 4 mAh). At a C/10 charge rate, the cycle life of the full cells including the columnar Li-negative electrodes was about 290. At a C/5 charge rate, the cycle life of the full cells including the columnar Li-negative electrodes was about 250.

Example 2

Figure 6:
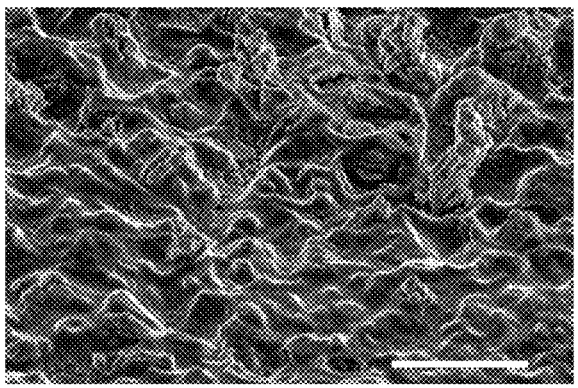
FIG. 6 is an SEM image of a top surface of a planar lithium metal layer formed on a copper substrate using an electrochemical deposition process.
Figure 7:
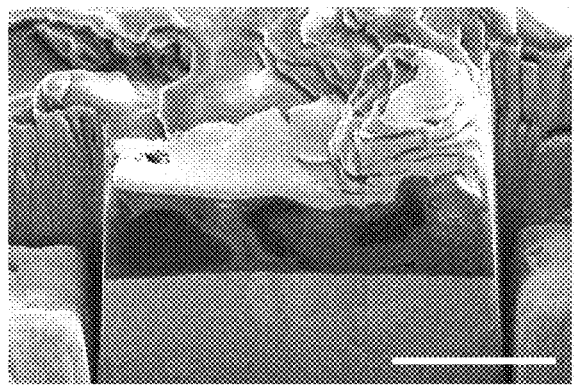
FIG. 7 is an SEM image of a cross-section of the planar lithium metal layer of FIG. 6.

For comparison, a negative electrode including a planar lithium metal layer (planar Li-negative electrode) was prepared by immersing a copper substrate (10 μm thickness) and a sacrificial lithium metal counter electrode in a non-aqueous liquid electrolyte solution. The copper substrate and the counter electrode were isolated from each other in the electrolyte solution by a polypropylene and polyethylene multilayer porous separator having a thickness of 25 μm. The electrolyte solution included 4M lithium bis(fluorosulfonyl)imide (LiFSI) dissolved in 1,2-dimethoxyethane (DME) (the LiFSI-DME electrolyte solution). An electric charge of 0.5 mA/cm$^2$ was applied to the counter electrode for a duration of about 8 hours to deposit a planar lithium metal layer having a thickness of 20 μm and a porosity of 2% on the copper substrate. The morphology of the resulting planar lithium metal layer is shown in FIGS. 6 and 7. The scale bar in FIG. 6 is 10 μm. The scale bar in FIG. 7 is 4 μm.

The cycling performance of the planar Li-negative electrodes was evaluating by using the as-prepared planar Li-negative electrodes to construct full lithium battery cells. Each cell was assembled in an Ar-filled glovebox and included a positive electrode and a porous separator positioned between the planar Li-negative electrode and the positive electrode. The positive electrode included a layer of lithium nickel manganese cobalt oxide (NMC) having a thickness of 80 μm coated on an aluminum foil (16 μm thickness). The porous separator was a multilayer polypropylene and polyethylene separator having a thickness of 25 μm. Each full cell was filled with the LiFSI-DME electrolyte solution. The capacity of each full cell was 5 mAh.

The cycling performance of the full cells including the planar Li-negative electrodes was evaluated by discharging and recharging the cells at different charge rates: C/10 (0.5 mA/cm$^2$) and C/5 (1 mA/cm$^2$) within a voltage window of 3.0 V to 4.3 V. The cycle life of each of the cells was met when the maximum charge capacity of the cell was reduced to 85% of its initial capacity (i.e., when the maximum charge capacity of each cell fell below 4 mAh). At a C/10 charge rate, the cycle life of the cells including the planar Li-negative electrodes was about 130. At a C/5 charge rate, the cycle life of the cells including the planar Li-negative electrodes was about 65.

The overall cycle life of the full cells prepared with the planar Li-negative electrodes was less than the cycle life of the full cells prepared with the columnar Li-negative electrodes. In addition, the cycle life of the full cells prepared with the planar Li-negative electrodes was significantly impacted by an increase in charge rate from C/10 to C/5 (cycle life reduced from 130 to 65). However, the cycle life of the full cells prepared with the columnar Li-negative electrodes was only mildly impacted by an increase in charge rate from C/10 to C/5 (cycle life reduced from 290 to 250). This indicates that the use of Li-negative electrodes having a three-dimensional columnar structure, instead of a planar structure, can help increase the charging rate and cycle life of secondary lithium metal batteries, without sacrificing capacity.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of manufacturing a negative electrode for an electrochemical cell of a lithium metal battery, the method comprising:
   providing an electrically conductive metal substrate;
   providing a nonaqueous liquid electrolyte solution including a lithium salt dissolved in a polar aprotic organic solvent;
   at least partially submerging a surface of the metal substrate in the electrolyte solution; and
   establishing an electrical potential between the metal substrate and a counter electrode at least partially submerged in the electrolyte solution such that lithium ions in the electrolyte solution are reduced to metallic lithium and deposited on the surface of the metal substrate in the form of a three-dimensional columnar lithium metal layer,
   wherein the lithium salt comprises lithium bis(fluorosulfonyl)imide (LiFSI) and the polar aprotic organic solvent comprises fluoroethylene carbonate (FEC) and dimethyldicarbonate (DMDC), and
   wherein the fluoroethylene carbonate and the dimethyldicarbonate constitute, by weight, greater than 90% of the polar aprotic organic solvent, and
   wherein the columnar lithium metal layer comprises a plurality of polycrystalline or amorphous columns of lithium metal having proximal ends adjacent the surface of the metal substrate and distal ends extending away from the metal substrate.

2. The method of claim 1 wherein the columnar lithium metal layer comprises, by weight, greater than 97% lithium and is directly bonded to the surface of the metal substrate.

3. The method of claim 1 wherein the nonaqueous liquid electrolyte solution has a lithium salt concentration in the range of 2 M to 6 M.

4. The method of claim 1 wherein lithium bis(fluorosulfonyl)imide constitutes, by weight, greater than 70% of the lithium salt in the nonaqueous liquid electrolyte solution.

5. The method of claim 1 wherein the columnar lithium metal layer has a thickness in the range of 10 micrometers to 100 micrometers.

6. The method of claim 1 wherein each of the columns of lithium metal has a width in the range of 0.5 micrometers to 1.5 micrometers.

7. The method of claim 1 wherein the columnar lithium metal layer has a porosity in the range of 3% to 4%.

8. The method of claim 1 wherein the surface of the metal substrate is planar, and wherein a surface of the columnar lithium metal layer is nonplanar.

9. The method of claim 1 wherein the electrical potential between the metal substrate and the counter electrode is established by applying an electric charge to the counter electrode at an electric charge current density in the range of 0.5 $mA/cm^2$ to 5 $mA/cm^2$.

10. The method of claim 1 wherein the electrical potential between the metal substrate and the counter electrode is established by applying a pulsed electric charge to the counter electrode.

11. The method of claim 1 wherein the metal substrate is non-porous and includes a first major surface and an opposite second major surface, and wherein the columnar lithium metal layer is formed on at least one of the first or second major surfaces of the metal substrate.

12. The method of claim 1 comprising:
   after the lithium metal layer is formed on the surface of the metal substrate, forming the metal substrate and the lithium metal layer into a negative electrode exhibiting a desired size and shape; and
   incorporating the negative electrode into an electrochemical cell of a secondary lithium metal battery.

13. The method of claim 1 wherein the capacity loading of the columnar lithium metal layer on the metal substrate is in the range of 2 $mAh/cm^2$ to 20 $mAh/cm^2$.

14. The method of claim 1 wherein a volume ratio of the fluoroethylene carbonate and the dimethyldicarbonate in the polar aprotic organic solvent is 1:1.

* * * * *